United States Patent
Hung (10) Patent No.: US 8,276,867 B2
(45) Date of Patent: Oct. 2, 2012

(54) ADJUSTABLE PROJECTOR BRACKET ASSEMBLY

(75) Inventor: Chin-Jui Hung, Taichung Hsien (TW)

(73) Assignee: Modernsolid Industrial Co., Ltd., Wu-Chi Chen, Taichung Hsien (TW)

( * ) Notice: Subject to any disclaimer, the term of this patent is extended or adjusted under 35 U.S.C. 154(b) by 247 days.

(21) Appl. No.: 12/855,515

(22) Filed: Aug. 12, 2010

(65) Prior Publication Data

US 2012/0037776 A1    Feb. 16, 2012

(51) Int. Cl.
*A47H 1/10* (2006.01)

(52) U.S. Cl. ..... 248/323; 248/324; 248/342; 248/274.1; 248/276.1; 248/298.1; 353/79; 353/119; 403/52; 403/345

(58) Field of Classification Search ............... 248/309.1, 248/317, 323, 324, 342, 343, 917–923, 205.1, 248/282.1, 283.1, 274.1, 276.1, 280.11, 281.11, 248/222.51, 222.52, 225.11, 223.41, 284.1, 248/289.11, 291.1, 298.1; 353/79, 119; 403/52, 403/79–80, 345; 361/679.01
See application file for complete search history.

(56) References Cited

U.S. PATENT DOCUMENTS

| | | | | |
|---|---|---|---|---|
| 5,009,384 | A * | 4/1991 | Gerke et al. | 248/343 |
| 5,598,785 | A * | 2/1997 | Zaguroli, Jr. | 104/111 |
| 5,924,260 | A * | 7/1999 | Austin et al. | 52/698 |
| 6,485,144 | B1 * | 11/2002 | Liao | 352/243 |
| 6,988,698 | B2 * | 1/2006 | O'Neill | 248/323 |
| 7,464,909 | B2 * | 12/2008 | Li | 248/280.11 |
| 7,481,410 | B2 * | 1/2009 | Umberg | 248/551 |
| 7,861,998 | B2 * | 1/2011 | Huang | 248/125.1 |
| 7,942,375 | B2 * | 5/2011 | Dozier et al. | 248/324 |
| 7,988,119 | B2 * | 8/2011 | Dittmer et al. | 248/323 |
| 8,033,519 | B2 * | 10/2011 | David | 248/324 |
| 8,138,469 | B2 * | 3/2012 | Dittmer | 250/239 |
| 2006/0061738 | A1 * | 3/2006 | Rizzo | 353/119 |
| 2008/0061200 | A1 * | 3/2008 | Bouissiere | 248/206.5 |
| 2010/0045943 | A1 * | 2/2010 | Gillespie | 353/79 |
| 2010/0155563 | A1 * | 6/2010 | Koh | 248/449 |
| 2010/0237210 | A1 * | 9/2010 | Anderson et al. | 248/274.1 |
| 2011/0089300 | A1 * | 4/2011 | Walters et al. | 248/274.1 |

FOREIGN PATENT DOCUMENTS

JP    2010262184 A  * 11/2010

* cited by examiner

*Primary Examiner* — Amy Sterling
*Assistant Examiner* — Todd M Epps
(74) *Attorney, Agent, or Firm* — patenttm.us (57) ABSTRACT

An adjustable projector bracket assembly has a pivoting device, a moving device and an adjusting device. The moving device is slidably connected with the pivoting device and has a bottom. The adjusting device is mounted on the bottom of the moving device and has a projector bracket and at least three supporting arms. The projector bracket has at least three arm grooves formed through the projector bracket. The at least three supporting arms are respectively pivotally and slidably connected with the at least three arm grooves. With the supporting arms pivotally and slidably connected with the arm grooves, projectors P of different sizes or having different assembling holes can be mounted securely on the projector bracket.

10 Claims, 8 Drawing Sheets

ADJUSTABLE PROJECTOR BRACKET ASSEMBLY

BACKGROUND OF THE INVENTION

1. Field of the Invention

The present invention relates to an apparatus which can fix a projector, and more particularly to an adjustable projector bracket assembly.

2. Description of Related Art

A conventional projector bracket assembly is mounted securely on a ceiling and is connected securely with a projector to hang the projector on the ceiling. However, the conventional projector bracket assembly is connected with the projector of a specific size and cannot be adjusted to fit different projectors of different sizes. Consequently, to use the conventional projector bracket assembly is inconvenient.

To overcome the shortcomings, the present invention tends to provide an adjustable projector bracket assembly to mitigate the aforementioned problems.

SUMMARY OF THE INVENTION

The main objective of the invention is to provide an adjustable projector bracket assembly which can be mounted securely with different projectors with different sizes.

An adjustable projector bracket assembly has a pivoting device, a moving device and an adjusting device. The moving device is slidably connected with the pivoting device and has a bottom. The adjusting device is mounted on the bottom of the moving device and has a projector bracket and at least three supporting arms. The projector bracket has at least three arm grooves formed through the projector bracket. The at least three supporting arms are respectively pivotally and slidably connected with the at least three arm grooves. With the supporting arms pivotally and slidably connected with the arm grooves, projectors P of different sizes or having different assembling holes can be mounted securely on the projector bracket.

Other objects, advantages and novel features of the invention will become more apparent from the following detailed description when taken in conjunction with the accompanying drawings.

DETAILED DESCRIPTION OF PREFERRED EMBODIMENT

Figure 1:
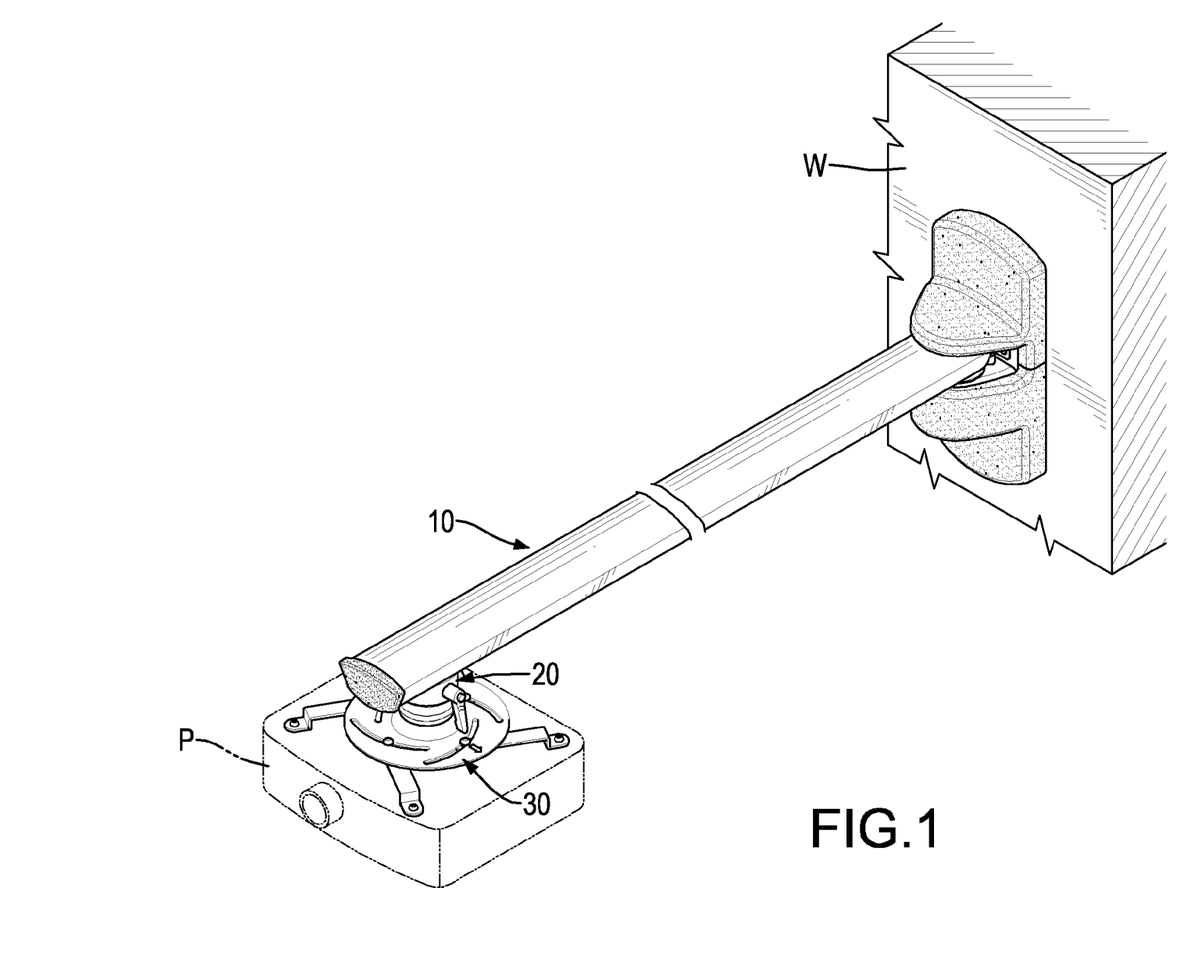
FIG. 1 is a perspective view of an adjustable projector bracket assembly in accordance with the present invention.
Figure 2:
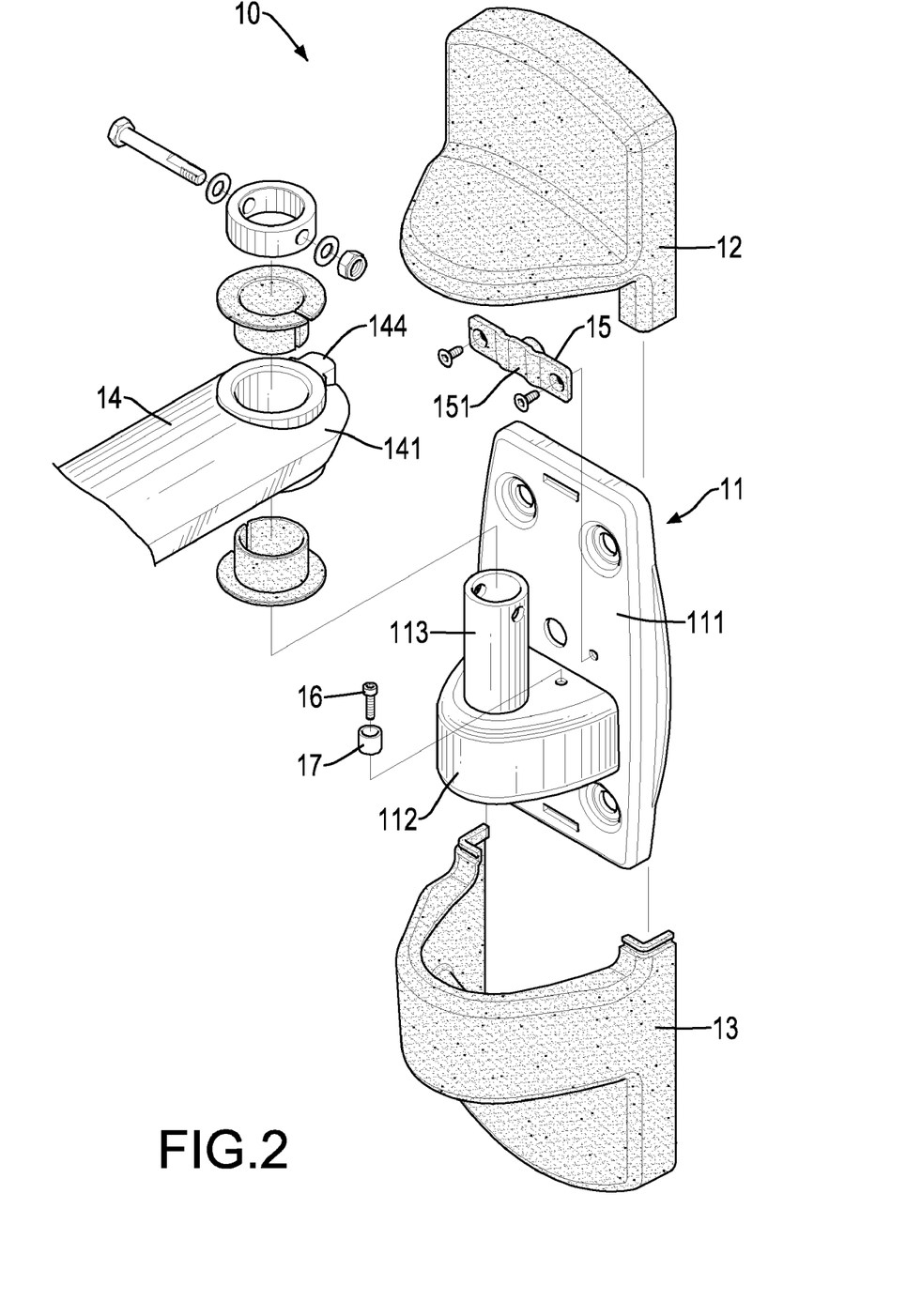
FIG. 2 is an enlarged exploded perspective view of the adjustable projector bracket assembly in FIG. 1.
Figure 3:
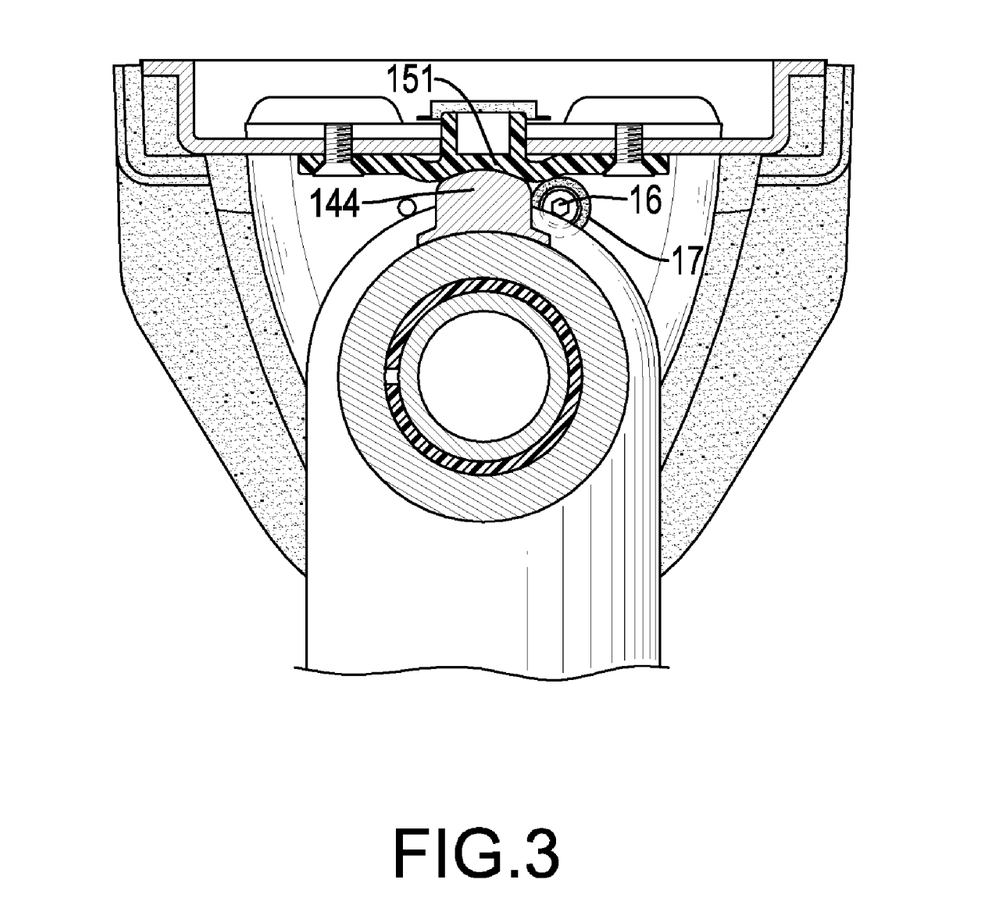
FIG. 3 is an enlarged cross sectional top view of the adjustable projector bracket assembly in FIG. 1.

With reference to FIGS. 1 to 3, an adjustable projector bracket assembly in accordance with the present invention comprises a pivoting device 10, a moving device 20 and an adjusting device 30.

The pivoting device 10 has a base 11, an upper cover 12, a lower cover 13, a beam 14 and a strip 15.

The base 11 has a top, a bottom, a connecting surface 111, a wall surface, a protrusion 112 and a pivot tube 113. The wall surface is opposite to the connecting surface 111 and is mounted securely on a wall W. The protrusion 112 protrudes laterally from the connecting surface 111 and has a top. The pivot tube 113 is longitudinally mounted securely on the top of the protrusion 112 and is separated from the connecting surface 111. The upper cover 12 and the lower cover 13 are respectively mounted securely on the top and the bottom of the base 11.

Figure 4:
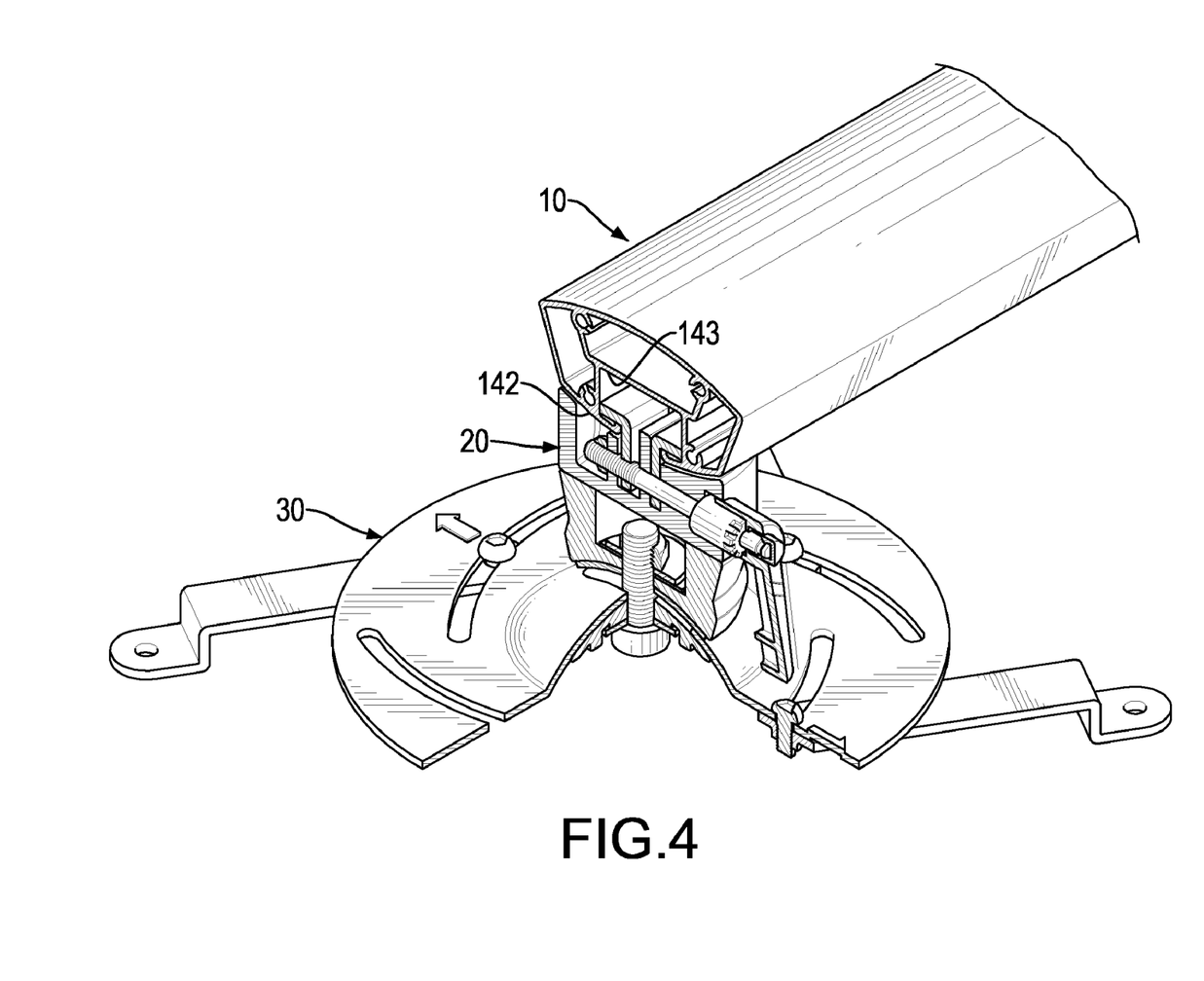
FIG. 4 is an enlarged perspective view in partial section of the adjustable projector bracket assembly in FIG. 1.

With further reference to FIG. 4, the beam 14 is elongated, is mounted laterally on and connected pivotally to the base 11. The beam 14 has a pivoting end 141, a bottom surface 142, a mount groove 143 and a pillar section 144. The pivoting end 141 is rotatably mounted around the pivot tube 113. The mount groove 143 is elongated and is formed in the bottom surface of the beam 14. The pillar section 144 is elongated and is formed at the pivoting end 141.

With reference to FIG. 3, preferably, the pivoting device 10 has a strip 15. The strip 15 is made of plastic, is mounted securely on the connecting surface 111 and has two ends and a concave section 151. The concave section 151 is arcuated, is formed between the ends of the strip 15 and abuts and engages the pillar section 144. With the engagement between the pillar section 144 and the concave section 151 of the strip 15, the beam 14 is kept from being pivoted abruptly and quickly and the shake of a projector P can be prevented.

Preferably, the pivoting device 10 has a blocking bolt 16 and a blocking ring 17. The blocking bolt 16 is longitudinally screwed securely into the top of the protrusion 112 beside the pivot tube 113 and is adjacent to one of the ends of the strip 15. The blocking ring 17 is rotatably mounted around the blocking bolt 16 and selectively abuts with the pillar section 144. The blocking ring 17 is used to restrict a pivoting range of the beam 14, and the location of the blocking bolt 16 and the blocking ring 17 is not limited and can be at a position adjacent to any end of the strip 15.

Figure 5:
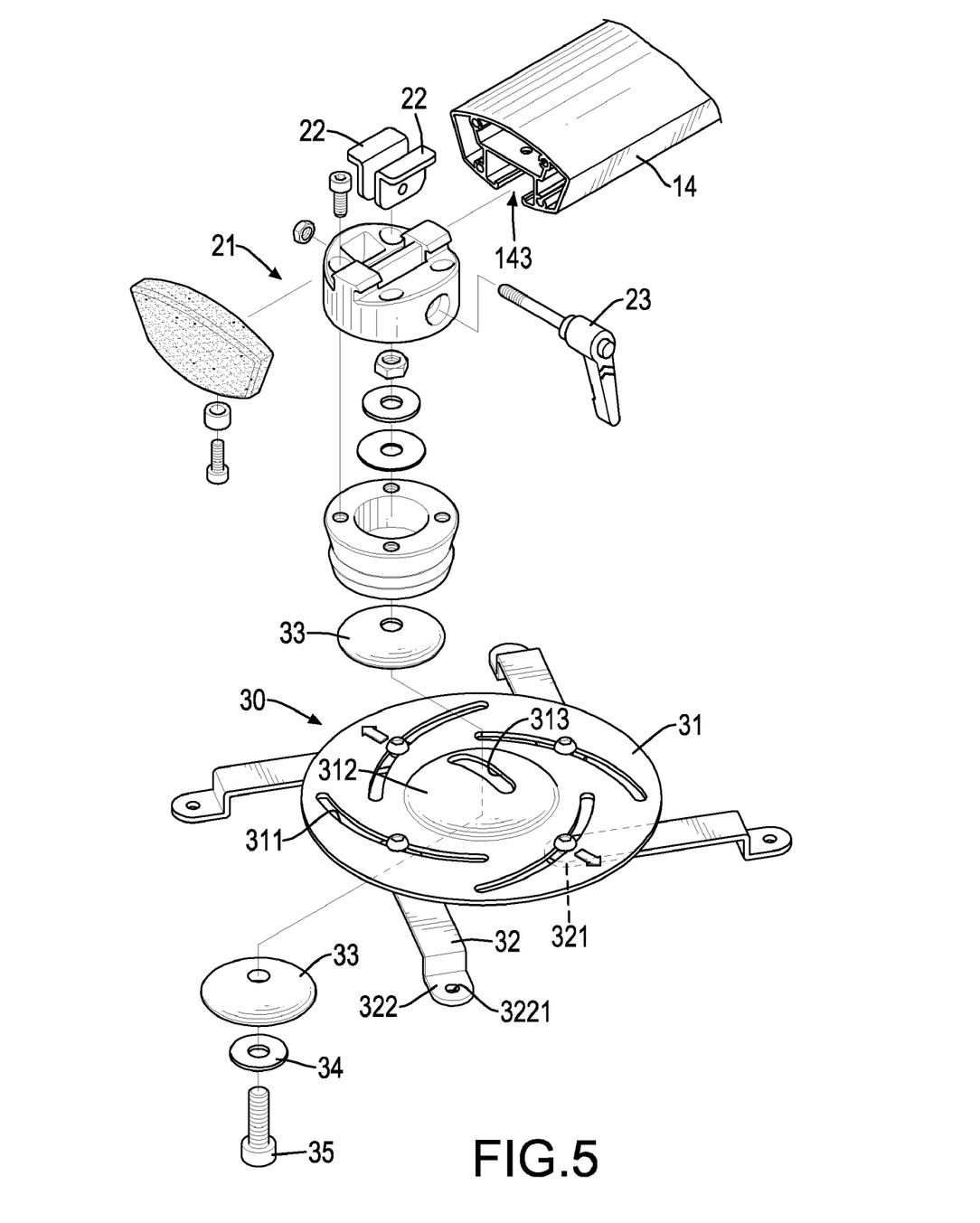
FIG. 5 is an exploded perspective view of the adjustable projector bracket assembly in FIG. 4.
Figure 6:
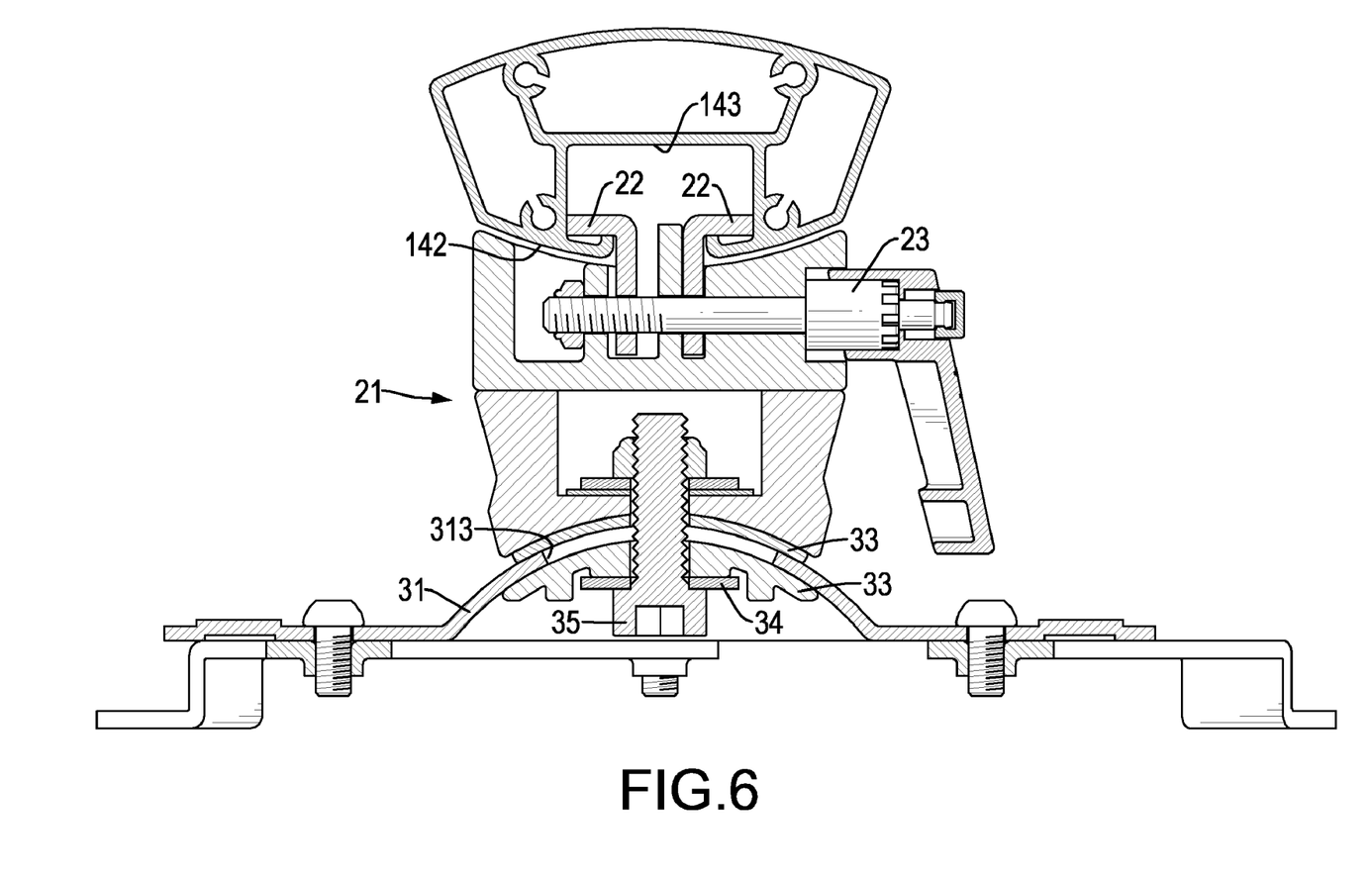
FIG. 6 is a side view in partial section of the adjustable projector bracket assembly in FIG. 4.

With reference to FIGS. 4 to 6, the moving device 20 is slidably connected with the pivoting device 10 and has a moving mount 21, two clamps 22 and a mount bolt 23. The moving mount 21 is mounted below the beam 14 and has a head and a bottom opposite to the head. The clamps 22 are reversed L-shaped, are slidably mounted in the mount groove 143, are mounted in and protrude out from the head of the moving mount 21 and are capable of approaching each other. One of the clamps 22 has a threaded hole formed through the clamp 22. The mount bolt 23 is rotatably and radially mounted in the head of the moving mount 21 and through the clamps 22. The threaded hole of the clamp 22 is movably mounted around the mount bolt 23. When the clamps 22 are moved away from each other, the clamps 22 press two inner surfaces of the mount groove 143 to secure the moving device 20 on the beam 14. When the clamps 22 are moved closely to each other, the moving device 20 can be moved along the mount groove 143. The clamps 22, the mount groove 143 and the mount bolt 23 may be conventional and detailed description is omitted.

With reference to FIGS. 4 to 6, the adjusting device 30 is rotatably mounted on the bottom of the moving mount 21 and has a projector bracket 31 and at least three supporting arms 32. The projector bracket 31 is round, is mounted below the bottom of the moving mount 21 and has at least three arm grooves 311 formed through the projector bracket 31. The at least three supporting arms 32 are respectively connected pivotally and slidably to the at least three arm grooves 311.

Figure 7:
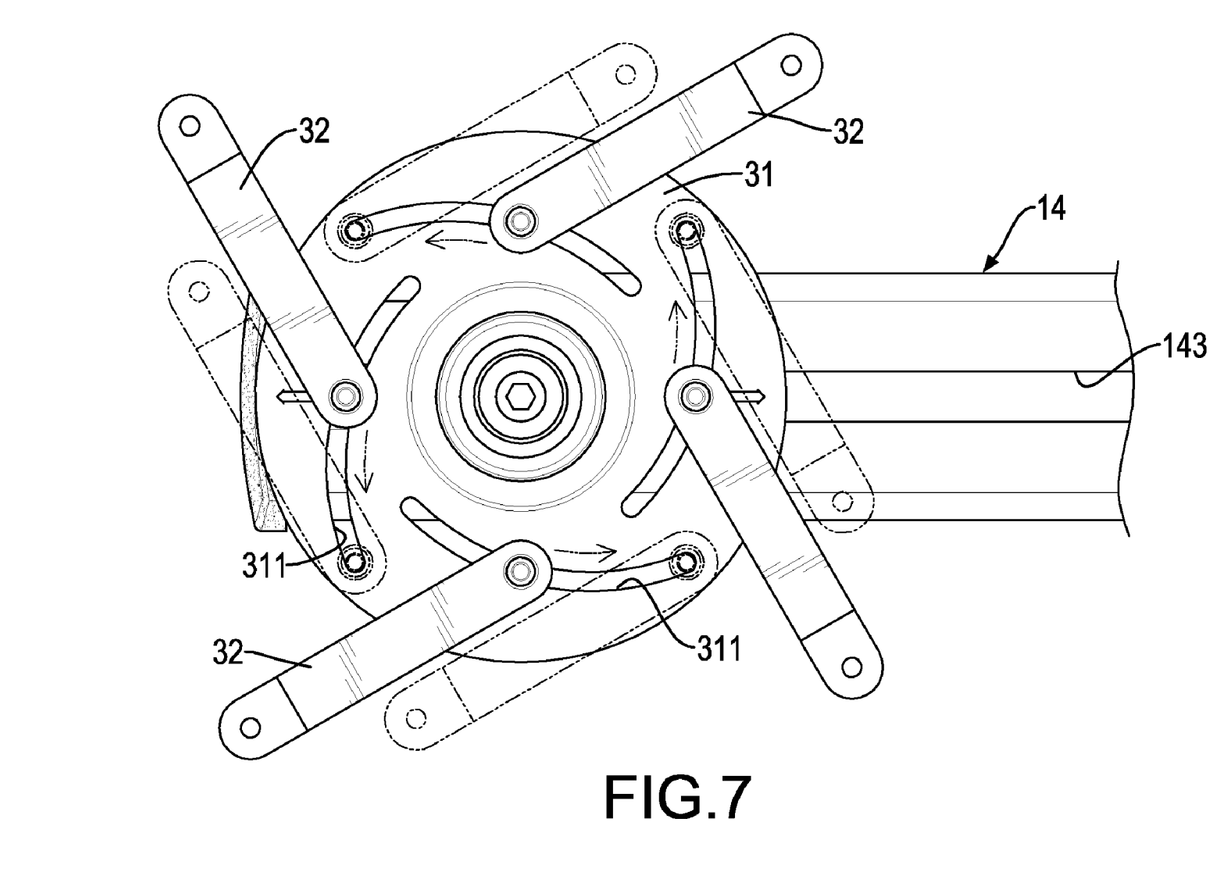
FIG. 7 is an operational bottom view of the adjustable projector bracket assembly in FIG. 4.

Each supporting arm 32 has an adjusting end 321 and a mounting end 322 opposite to the adjusting end 321. The adjusting end 321 is slidably connected with a corresponding arm groove 311 via a bolt. The mounting end 322 has a through hole 3221 formed though the mounting end 322. Preferably, the through holes 3221 are threaded and can be securely connected with a projector P with bolts. With reference to FIG. 7, because the supporting arms 32 are pivotally and slidably connected with the arm grooves 311, projectors P of different sizes or having different assembling holes can be mounted securely on the projector bracket 31.

Preferably, four arm grooves 311 are implemented and are spaced at intervals. The projector bracket 31 has an outer edge and a central position 312. The arm grooves 311 are arcuated and elongated from the central position 312 to the outer edge of the projector bracket 31 in an operational rotation direction, such as in clockwise as shown in FIGS. 5 and 7. With the arm grooves 311, the supporting arms 32 can be moved from the central position 312 to the outer edge of the projector bracket 31 and the positions of the supporting arms 32 can be adjusted. Accordingly, projectors P of different sizes or having different assembling holes can be mounted securely on the projector bracket 31.

Figure 8:
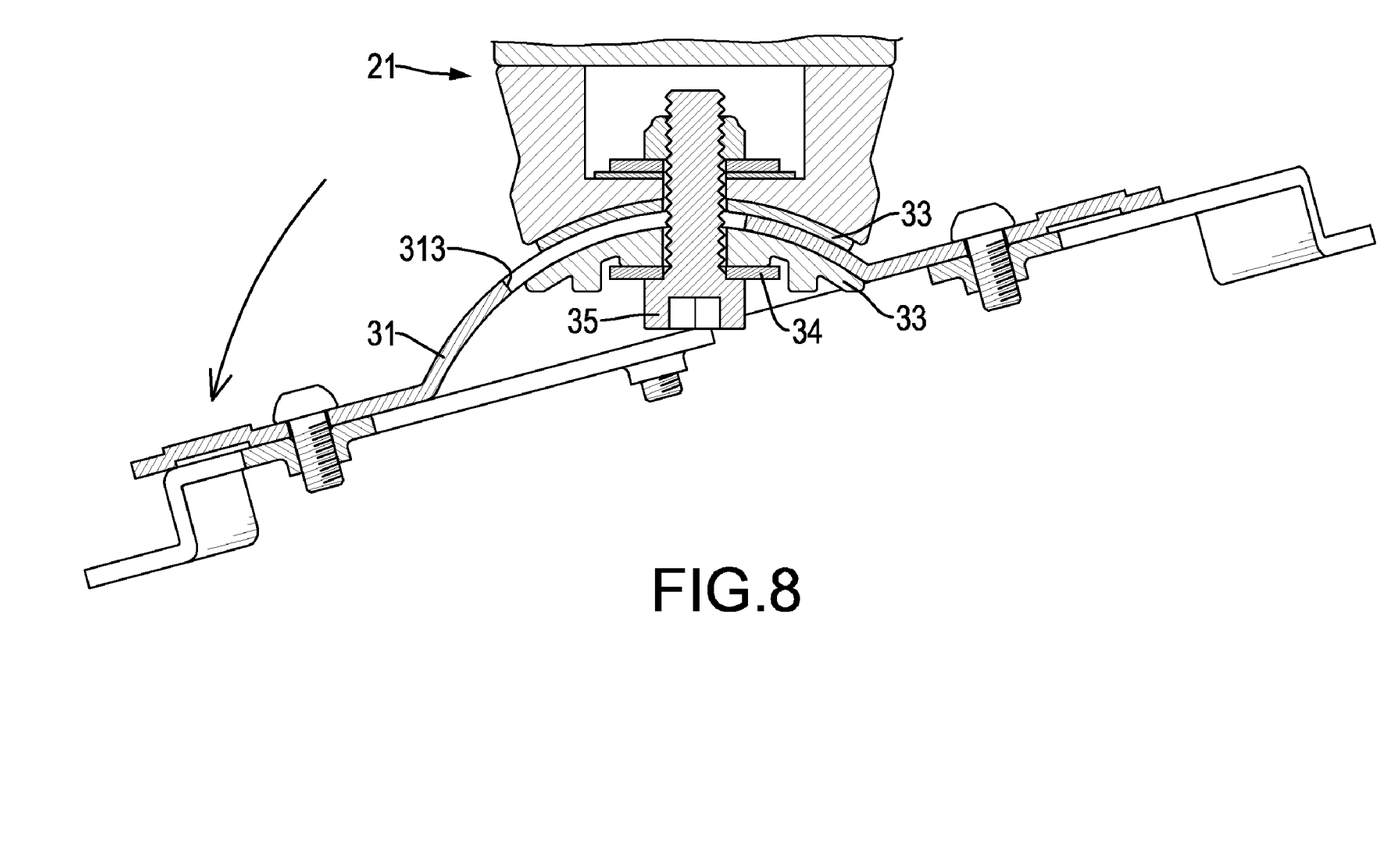
FIG. 8 is an operational side view in partial section of the adjustable projector bracket assembly in FIG. 6.

Preferably, the central position 312 of the projector bracket 31 has a convex and round top and a concave and round bottom. The projector bracket 31 has an elongated angle adjusting groove 313 formed through the central position 312 of the projector bracket 31. The adjusting device 30 further has two pads 33, a washer 34 and a positioning pin 35. The pads 33 respectively abut the top and the bottom of the projector bracket 31. The washer 34 abuts the pad 33 which abuts the bottom of the projector bracket 31. The positioning pin 35 may be a bolt, is longitudinally mounted through the angle adjusting groove 313, the pads 33 and the washer 34 and is screwed securely into the bottom of the moving mount 21. With reference to FIG. 8, after the positioning pin 35 is released, the projector bracket 31 can be slid and pivoted along the angle adjusting groove 313 at the center at the positioning pin 35 to adjust angles of elevation and depression of the projector P.

From the above description, it is noted that the present invention has the following advantages:

1. Versatile Assembly for Different Projectors P:

Because the supporting arms 32 are pivotally and slidably connected with the arm grooves 311, the supporting arms 32 can be moved from the central position 312 to the outer edge of the projector bracket 31 along the arm grooves 311. Accordingly, the projector bracket assembly in accordance with the present invention can be adjusted to fit with projectors P of different sizes or having different assembling holes.

2. Easy Adjustment of the Angles of the Elevation and Depression of the Projector P:

Because the central position 312 of the projector bracket 31 has a concave and round bottom through which the angle adjusting groove 313 is formed, the projector bracket 31 can be slid along the angle adjusting groove 313 and the angles of elevation and depression of the projector P can be further adjusted.

3. Multidirectional Adjustment of the Projector P:

The projector P can be pivoted by the pivoting device 10, can be slid by the moving device 20 and can be rotated by the adjusting device 30, such that the position of the projector P can be adjusted in multi-directions and this is very convenient.

4. Steady Pivotal Movement of the Projector P:

With the engagement between the pillar section 144 and the concave section 151 of the strip 15, the beam 14 can be kept from being pivoted abruptly and quickly and the shake of the projector P is prevented.

5. Restriction on the Pivoting Range of the Beam 14:

The blocking ring 17 can provide a restricting effect to the pivoting range of the beam 14 to keep the projector P from being horizontally moved too much.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An adjustable projector bracket assembly comprising:

a pivoting device having a base; and a beam mounted laterally on and connected pivotally to the base and having a bottom surface; and an elongated mount groove formed in the bottom surface of the beam;

a moving device slidably connected with the pivoting device and having a moving mount mounted below the beam and having a head and a bottom opposite to the head;

two reversed L-shaped clamps slidably mounted in the mount groove, mounted in and protruding out from the head of the moving mount and capable of approaching each other; and a mount bolt rotatably and radially mounted in the head of the moving mount and through the clamps; and an adjusting device mounted on the bottom of the moving mount and having a projector bracket mounted below the bottom of the moving mount and having at least three arm grooves formed through the project bracket; and at least three supporting arms respectively connected pivotally and slidably to the at least three arm grooves, each supporting arm having an adjusting end slidably connected with a corresponding arm groove; and a mounting end opposite to the adjusting end and having a through hole formed though the mounting end.

2. The adjustable projector bracket assembly as claimed in claim 1, wherein the projector bracket has an outer edge and a central position; and the arm grooves are arcuated and elongated from the central position to the outer edge of the projector bracket in an operational rotation direction.

3. The adjustable projector bracket assembly as claimed in claim 2, wherein
- the central position of the projector bracket has a convex and round top and a concave and round bottom;
- the projector bracket has an elongated angle adjusting groove formed though the central position of the projector bracket; and
- the adjusting device has a positioning pin being a bolt, longitudinally mounted through the angle adjusting groove and screwed securely into the bottom of the moving mount.

4. The adjustable projector bracket assembly as claimed in claim 3, wherein
- the pivoting device has a strip;
- the base has
  - a connecting surface;
  - a wall surface opposite to the connecting surface;
  - a protrusion protruding laterally from the connecting surface and having a top; and
  - a pivot tube longitudinally mounted securely on the top of the protrusion and separated from the connecting surface;
- the beam has a pivoting end rotatably mounted around the pivot tube; and
- the strip is mounted securely on the connecting surface and abuts the pivoting end.

5. The adjustable projector bracket assembly as claimed in claim 4, wherein the strip has two ends; and
- the pivoting device has
  - a blocking bolt longitudinally screwed securely into the top of the protrusion beside the pivot tube and being adjacent to one of the ends of the strip; and
  - a blocking ring rotatably mounted around the blocking bolt.

6. The adjustable projector bracket assembly as claimed in claim 1, wherein four arm grooves are implemented and are spaced at intervals.

7. The adjustable projector bracket assembly as claimed in claim 2, wherein four arm grooves are implemented and are spaced at intervals.

8. The adjustable projector bracket assembly as claimed in claim 3, wherein four arm grooves are implemented and are spaced at intervals.

9. The adjustable projector bracket assembly as claimed in claim 4, wherein four arm grooves are implemented and are spaced at intervals.

10. The adjustable projector bracket assembly as claimed in claim 5, wherein four arm grooves are implemented and are spaced at intervals.

* * * * *